(12) United States Patent
Hiraiwa

(10) Patent No.: US 7,340,973 B2
(45) Date of Patent: Mar. 11, 2008

(54) TWIN-CLUTCH TRANSMISSION

(75) Inventor: Kazuyoshi Hiraiwa, Yokohama (JP)

(73) Assignee: Kyowa Metal Works Co., Ltd. (JP)

( * ) Notice: Subject to any disclaimer, the term of this patent is extended or adjusted under 35 U.S.C. 154(b) by 206 days.

(21) Appl. No.: 10/541,179

(22) PCT Filed: Jan. 9, 2004

(86) PCT No.: PCT/JP2004/000098

§ 371 (c)(1),
(2), (4) Date: Jun. 30, 2005

(87) PCT Pub. No.: WO2004/063596

PCT Pub. Date: Jul. 29, 2004

(65) Prior Publication Data

US 2006/0169078 A1    Aug. 3, 2006

(30) Foreign Application Priority Data

Jan. 14, 2003 (JP) .............................. 2003-005163

(51) Int. Cl.
*F16H 3/08* (2006.01)

(52) U.S. Cl. ........................................ 74/330; 74/331

(58) Field of Classification Search .................. 74/330, 74/331
See application file for complete search history.

(56) References Cited

U.S. PATENT DOCUMENTS

| | | | | |
|---|---|---|---|---|
| 3,589,483 A | * | 6/1971 | Smith ......................... | 192/3.52 |
| 4,106,364 A | * | 8/1978 | Zenker et al. ................ | 74/745 |
| 4,576,063 A | * | 3/1986 | Akashi et al. ................ | 74/745 |
| 4,594,908 A | * | 6/1986 | Akashi et al. ................ | 74/359 |
| 4,738,149 A | | 4/1988 | Janiszewski | |
| 5,390,560 A | * | 2/1995 | Ordo ........................... | 74/329 |
| 5,720,203 A | * | 2/1998 | Honda et al. ................. | 74/325 |
| 7,044,013 B2 | * | 5/2006 | Ahrens ........................ | 74/331 |

FOREIGN PATENT DOCUMENTS

| | | |
|---|---|---|
| JP | 3-364 U | 1/1991 |
| JP | 8-74949 A | 3/1996 |
| JP | 8-93861 A | 4/1996 |
| JP | 11-51125 A | 2/1999 |
| JP | 11-51126 A | 2/1999 |
| JP | 2001-295898 A | 10/2001 |
| JP | 2002-347458 A | 12/2002 |
| JP | 2003-120764 A | 4/2003 |

* cited by examiner

*Primary Examiner*—Tisha Lewis
(74) *Attorney, Agent, or Firm*—Rossi, Kimms & McDowell LLP.

(57) ABSTRACT

A pair of first speed gears (26a, 26b) is provided between a first input shaft (14) and a first output shaft (20), and a pair of fourth speed gears (30a, 30b) is provided between a second input shaft (18) and the first output shaft. A pair of third speed gears (34a, 34b) and a pair of fifth speed gears (36a, 36b) are provided between the first input shaft and a second output shaft (22), and a pair of second speed gears (40a, 40b) and a pair of sixth speed gears (30a, 42b) are provided between the second input shaft and the second output shaft. A backward input gear (34a) integrated with the first input shaft and a backward output gear (46b) provided on the first output shaft are connected to each other via idler gears (46a, 46b) disposed on a sub shaft (24). By this arrangement the length in an axial direction of the transmission is made short.

9 Claims, 5 Drawing Sheets

TWIN-CLUTCH TRANSMISSION

CROSS-REFERENCE TO RELATED APPLICATION

This application is a U.S. National Phase Application of PCT International Application PCT/JP2004/000098.

TECHNICAL FIELD

The present invention relates to a twin-clutch transmission for an automobile, which is comprised of two clutches disposed between an engine and the transmission mechanism and is capable of alternately engaging and disengaging the two clutches in parallel with shifting operation so that gear speed can be sequentially changed without interrupting driving force.

BACKGROUND ART

Conventionally, there has been a twin-clutch transmission which is capable of alternately engaging and disengaging two clutches in parallel with shifting operation so that gear speed (gear ratio) can be sequentially changed without interrupting driving force, and in which a first clutch is disposed between the output shaft of an engine and a first input shaft (first clutch output shaft) and a second clutch is disposed between the output shaft of the engine and a second input shaft (second clutch output shaft), a pair of first speed gears and a pair of third speed gears are disposed between the first input shaft and the first and second output shafts, and a pair of second speed gears and a pair of fourth speed gears are disposed between the second input shaft and the first and second output shafts (see Japanese Laid-Open Patent Publication (Kokai) No. H11-051125, for example).

According to the above prior art, after transmission gears connected to the other one of the first and second clutches are changed while driving force from the engine is being transmitted by one of the first and second clutches, the other one of the first and second clutches is engaged while the one of the first and second clutches is being disengaged so that gear speed can be changed without interrupting driving force.

In the conventional twin-clutch transmission constructed as described above, the total length (axial length) can be reduced since the pairs of transmission gears are arranged with the two output shafts. However, only four forward speed gear ratios can be obtained, and hence satisfactory acceleration performance and fuel economy cannot be achieved.

Also, the conventional twin-clutch transmission has no means for mechanically locking the output shafts, and hence an automobile cannot be reliably parked on a sloping road or the like and the safety cannot be ensured.

The present invention has been devised in view of the above conventional problems, and one of its object is to provide a transmission which can obtain forward sixth and seventh speed gear ratios suitable for automobiles so as to improve acceleration performance and fuel economy as compared with the above prior art transmission, and also reduce the total length as much as possible so that the transmission can be mounted even on a front-wheel-drive vehicle of an engine transverse type.

Also, another object of the present invention is to provide a means for mechanically locking output shafts so as to improve the safety in parking on a sloping road or the like.

DISCLOSURE OF INVENTION

To attain the above object, a twin-clutch transmission of claim 1 is characterized in that driving force from an engine can be transmitted to a first input shaft via a first clutch and to a second input shaft via a second clutch; a plurality of pairs of shift gears are disposed between the first input shaft and the second input shaft and a first output shaft, second output shaft, and a sub shaft disposed in parallel with the first input shaft and the second input shaft; such that a pair of first speed gears is provided between the first input shaft and the first output shaft, and a pair of fourth speed gears is provided between the second input shaft and the first output shaft; a pair of third speed gears and a pair of fifth speed gears are provided between the first input shaft and the second output shaft, and a pair of second speed gears and a pair of sixth speed gears are provided between the second input shaft and the second output shaft; and a backward input gear integrated with the first input shaft and a backward output gear provided on the first output shaft are connected to each other via idler gears provided on the sub shaft.

With this arrangement, in the case where the first clutch is engaged, driving is selectively carried out at odd number gear speeds (i.e. forward first speed, third speed, and fifth speed) and a backward gear speed, and in the case where the second clutch is engaged, driving is selectively carried out at even number gear speeds (i.e. forward second speed, fourth speed, and sixth speed).

The pair of first speed gears and the first speed sleeve are provided between the pair of third speed gears and the pair of fifth speed gears, the 3-5 speed sleeve and the pair of first speed gears partially overlap in an axial direction, and recesses are formed in the first speed output gear, second speed output gear, and backward output gear each of which has a large diameter so that the respective sleeves can go into the recesses when they stroke, and as a result, the total length of the transmission can be reduced.

A twin-clutch transmission of claim 2 is characterized in that the third speed input gear of the pair of third speed gears, which is integrated with the first input shaft, doubles as a backward input gear.

In the case where the third output gear and the second output shaft are connected to each other, the third speed input gear carries out driving at the forward third speed, and in the case where the backward output gear and the first output shaft are connected to each other, the third speed input gear carries out driving at the backward gear speed.

Since the third speed input gear of the pair of third speed gears, which is integrated with the first input shaft, doubles as the backward input gear, manufacturing costs can be reduced due to a decrease in the number of parts, and the total length of the transmission can be reduced because of a decrease in the space required.

A twin-clutch transmission of claim 3 is characterized in that the backward output gear and the pair of second speed gears overlap in an axial direction.

Since the backward output gear and the pair of second speed gears overlap in an axial direction, the backward output gear drives the first output shaft in backward driving, and the pair of second speed gears drives the second output shaft in driving at the second speed.

The axial space required for backward driving can be small, and the total length of the transmission can be reduced.

A twin-clutch transmission of claim 4 is characterized in that a sleeve capable of connecting the third speed output gear of the pair of third speed gears and the fifth speed output gear of the pair of fifth speed gears to the second output shaft, and the pair of first speed gears partially overlap in an axial direction.

Driving is carried out at the forward third speed in the case where the sleeve connects the third speed output gear and the second output shaft to each other, driving is carried out at the forward fifth speed in the case where the sleeve connects the fifth speed output gear and the second output shaft to each other, and driving is carried out at the forward first speed in the case where the first speed output gear of the pair of first speed gears and the first output shaft are connected to each other.

The axial space required for the pair of third speed gears, the pair of fifth speed gears, and the pair of first speed gears and the sleeves for connecting them can be small, and hence the total length of the transmission can be reduced.

A twin-clutch transmission of claim 5 is characterized in that a fifth input gear of the pair of fifth speed gears, which is integrated with the first input shaft, doubles as an input gear of a pair of seventh speed gears.

The fifth speed input gear carries out driving at the forward fifth speed in the case where the fifth speed output gear and the first output shaft are connected to each other, and the fifth speed input gear carries out driving at the forward seventh speed in the case where the seventh speed output gear and the second output shaft are connected to each other.

In the seven forward speed transmission, manufacturing costs can be reduced due to a decrease in the number of parts, and the total length of the transmission can be reduced since the space required can be small.

A twin-clutch transmission of claim 6 is characterized in that driving force from an engine can be transmitted to a first input shaft via a first clutch and to a second input shaft via a second clutch; a plurality of pairs of shift gears are arranged between the first input shaft and the second input shaft and a first output shaft, second output shaft, and a sub shaft arranged in parallel with the first input shaft and the second input shaft; and teeth for parking lock are formed on a sleeve capable of connecting an output gear of the plurality of pairs of shift gears to either of the first output shaft and the second output shaft.

By mechanically locking the teeth formed on the sleeve, the first output shaft or the second output shaft is locked in the rotative direction, and therefore the automobile can be reliably stopped.

BEST MODE OF CARRYING OUT THE INVENTION

Embodiments of the present invention will hereunder be described with reference to the drawings.

Figure 1:
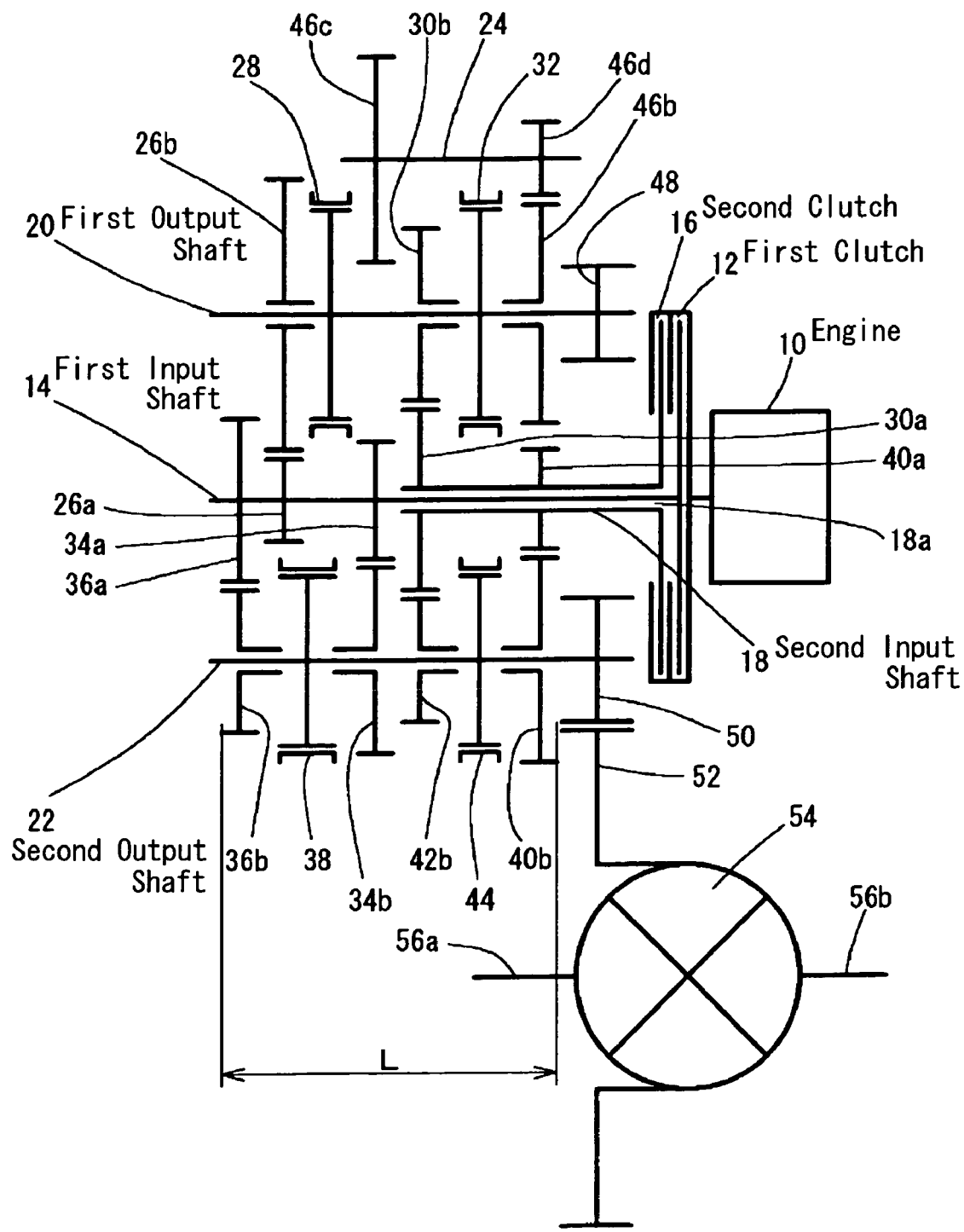
FIG. 1 is a skeleton diagram showing a twin-clutch transmission according to a first embodiment of the present invention.

FIG. 1 is a skeleton diagram showing essential parts of a twin-clutch transmission according to the first embodiment of the present invention.

Figure 2:
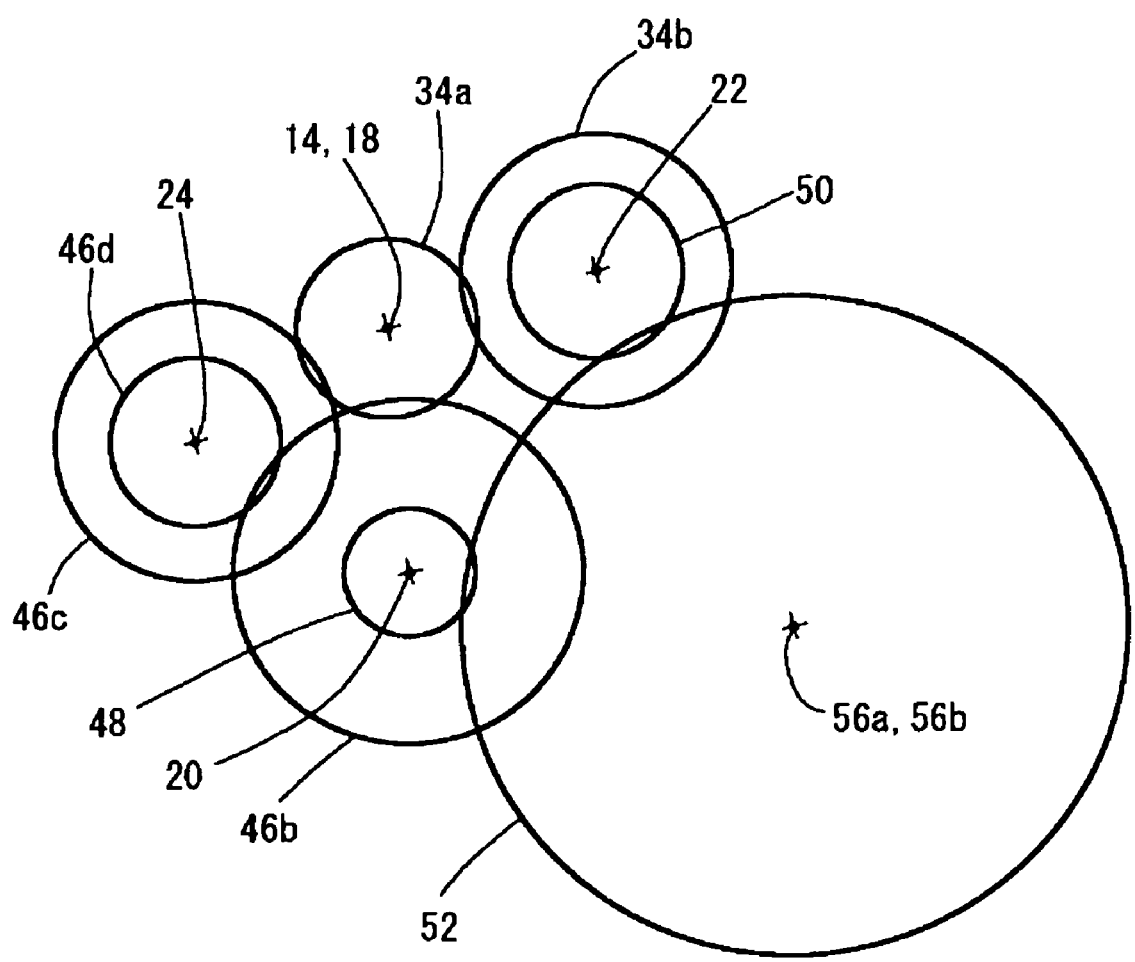
FIG. 2 is a diagram showing the arrangement of shafts as viewed from the left side in FIG. 1.

FIG. 1 shows a state in which the transmission with shafts thereof arranged as shown in FIG. 2 is spread out on a plane.

It should be noted that FIG. 2 shows the arrangement of the shafts as viewed from the left side in FIG. 1.

Power from an engine 10 can be transmitted in parallel to a first input shaft 14 via a first clutch 12 and to a second input shaft 18 via a second clutch 16.

The first input shaft 14 and the second input shaft 18 have a common axis, and the first input shaft 14 passes through a hole 18a of the second input shaft 18. A first output shaft 20, a second output shaft 22, and a sub shaft 24 are arranged in parallel with the first input shaft 14 and the second input shaft 18.

In FIG. 1, the distance between the first and second input shaft 14, 18 and the first output shaft 20 is set to be longer than the distance between the first and second input shaft 14, 18 and the second output shaft 22. These five shafts constitute the transmission mechanism.

A pair of first speed gears 26a and 26b which carries out driving at a forward first speed is disposed between the first input shaft 14 and the first output shaft 20. The first input gear 26a is integrated with the first input shaft 14, and the first speed output gear 26b is rotatably provided on the first output shaft 20, but it is arranged such that when a first speed sleeve 28 is moved to the left as viewed in FIG. 1, the first speed output gear 26b and the first output shaft 20 are connected to each other.

A pair of fourth speed gears 30a and 30b which carries out driving at a forward fourth speed is disposed between the second input shaft 18 and the first output shaft 20. The fourth speed input gear 30a is integrated with the second input shaft 18, and the fourth speed output gear 30b is rotatably provided on the first output shaft 20, but it is arranged such that when a 4-R speed sleeve 32 is moved to the left as viewed in FIG. 1, the fourth speed output gear 30b and the first output shaft 20 are connected to each other.

It should be noted that the fourth speed input gear 30a doubles as a sixth speed input gear as described later.

A pair of third speed gears 34a and 34b which carries out driving at a forward third speed and a pair of fifth speed gears 36a and 36b which carries out driving at a forward fifth speed are disposed between the first input shaft 14 and the second output shaft 22. The third speed input gear 34a and the fifth speed input gear 36a are integrated with the first input shaft 14, and the third speed output gear 34b and the fifth speed output gear 36b are rotatably provided on the second output shaft 22, but it is arranged such that when a 3-5 speed sleeve 38 is moved to the right as viewed in FIG. 1, the third speed output gear 34b and the second output shaft 22 are connected to each other, and when the 3-5 speed sleeve 38 is moved to the left as viewed in FIG. 1, the fifth speed output gear 36b and the second output shaft 22 are connected to each other.

A pair of second speed gears 40a and 40b which carries out driving at a forward second speed and a pair of sixth speed gears 30a and 42b which carries out driving at a forward sixth speed are disposed between the second input shaft 18 and the second output shaft 22. As mentioned above, the sixth speed input gear and the fourth speed input gear 30a are one and the same, but the pair of sixth speed gears is represented as the pair of sixth speed gears 30a and 42b.

The second speed input gear 40a is integrated with the second input shaft 18, and the second speed output gear 40b and the sixth speed output gear 42b are rotatably provided on the second output shaft 22, but it is arranged such that when a 2-6 speed sleeve 44 is moved to the right as viewed in FIG. 1, the second speed output gear 40b and the second output shaft 22 are connected to each other, and when the 2-6 speed sleeve 44 is moved to the left as viewed in FIG. 1, the sixth speed output gear 42b and the second output shaft 22 are connected to each other.

A backward output gear 46b which is rotatably provided on the first output shaft 20 is connected to the first output shaft 20 when the 4-R speed sleeve 32 is moved to the right, and the backward output gear 46b is constantly connected to the third speed input gear 34a via idler gears 46c and 46d integrated with the sub shaft 24.

The third speed input gear 34a and the idler gear 46c are constantly engaged with each other as shown in FIG. 2 although they are apart from each other in FIG. 1. The third speed input gear 34a doubles as a backward input gear.

Therefore, when the engine 10 drives the first input shaft 14, the backward output gear 46b rotates in the reverse direction (backward direction).

A first output gear 48 integrated with the first output shaft 20 and a second output gear 50 integrated with the second output shaft are engaged with a final reduction gear 52.

Specifically, as mentioned above, the shafts 14, 18, 20, 22, and 24 and the final reduction gear 52 are arranged as shown in FIG. 2. It should be noted that in FIG. 2, reference numerals denoting the shafts are put at the centers of axes. The first output gear 48 and the second output gear 50 are apart from each other, but both of them are engaged with the final reduction gear 52.

The reduction ratio of the first output gear 48 to the final reduction gear 52 is set to be greater than the reduction ratio of the second output gear 50 to the final reduction gear 52.

The final reduction gear 52 transmits power to left and right axles 56a and 56b via a differential 54, so that the axles 56a and 56b drive wheels, not shown.

Although neither illustrated nor explained, a synchronizer is provided between each of the sleeves 28, 32, 38, and 44 and each of the output gears 26b, 30b, 34b, 36b, 40b, 42b, and 46b so that the first output shaft 20 and the second output shaft 22 and each of the output gears 26b, 30b, 34b, 36b, 40b, 42b, and 46b can be smoothly connected to each other.

A description will now be given of the operation of the twin-clutch transmission according to the embodiment of the present invention, which is constructed as described above.

First, the automobile, which has been at a standstill with the left and right axles thereof unrotated, is started at the forward first speed.

In this case, even if the engine 10 is rotating, the first clutch 12 and the second clutch 16 are in the released state, and hence power is not transmitted to the wheels and the automobile does not move.

In this state, when the first speed sleeve 28 is moved to the left as viewed in FIG. 1 to connect the first speed output gear 26b and the first output shaft 20 to each other and gradually engage the first clutch 12, power from the engine 10 is transmitted from the first clutch 12 to the first output gear 48, final reduction gear 52, and differential 54 via the first input shaft 14, pair of first speed gears 26a and 26b, and first output shaft 20, and as a result, the axles 56a and 56b drive left and right wheels to move the automobile at the first speed gear ratio.

It should be noted that on this occasion, the second clutch 16 is remained in the released state.

Next, a description will be given of shifting from the forward first speed to the forward second speed.

In the state in which the automobile is running at the forward first speed with the first clutch 12 engaged as mentioned above, the 2-6 speed sleeve 44 is moved to the right as viewed in FIG. 1 with the second clutch 16 remained in the released state. Then, by engaging the second clutch 16 while disengaging the first clutch 12, the gear speed is changed to the second speed.

Specifically, the disengagement of the first clutch 12 stops transmission of power at the first speed and causes power from the engine 10 to be transmitted from the second clutch 16 to the second output gear 50 via the second input shaft 18, pair of second speed gears 40a and 40b, and second output shaft 22. Description of subsequent transmission of power to the wheels is omitted. The automobile runs at the second speed gear ratio as a result.

Since gear shifting is performed by alternately engaging and disengaging the first clutch 12 and the second clutch 16 as described above, gear speed can be changed without interruption of driving force that often occurs in an ordinary manual transmission.

Next, the gear speed is changed to the forward third speed by engaging the first clutch 12 while disengaging the second clutch 16 contrary to the above after the first speed sleeve 28 is returned to the original position and the 3-5 speed sleeve 38 is moved to the right as viewed in FIG. 1 to connect the third speed output gear 34b and the second output shaft 22 to each other from the state in which driving is carried out at the second speed with the first clutch 12 released.

Although detailed description is omitted, the gear speed can be changed from the second speed to the third speed without interrupting driving force as is the case with the shifting from the first speed to the second speed, and as a result, the automobile runs at the third speed gear ratio.

Subsequently, the gear speed can be changed to the fourth speed, the fifth speed, and the sixth speed in the same manner as described above.

Since it is arranged such that when the first clutch 12 is engaged, driving is carried out at odd number gear speeds, i.e. the first speed, third speed, and fifth speed, and when the second clutch 16 is engaged, driving is carried out at even number gear speeds, i.e. the second speed, fourth speed, and sixth speed, gear speed can be sequentially changed.

Although the description has been given of so-called up shift in which the gear speed is sequentially changed to higher speeds, it goes without saying that down shift in which the gear speed is changed to lower speeds may be carried out by performing operation in the order reverse to the above.

There is provided a control unit for automatically carrying out the above gear shifting operation, although detailed description thereof is omitted.

A description will now be given of backward driving.

As is the case with starting at the forward first speed, the gear speed is changed to a backward gear speed by moving the 4-R speed sleeve 32 to the right as viewed in FIG. 1 with the first clutch 12 released, connecting the backward output gear 46b and the first output shaft 20 to each other, and then gradually engaging the first clutch 12.

Specifically, as described above, the backward output gear 46b is reversely driven by the third speed input gear 34a, which doubles the backward input gear, via the idler gears 46c and 46d, and therefore the first output shaft 20 is driven in the backward direction.

Thus, in the embodiment of the present invention, although the transmission is the six forward speed and one backward speed type, gear shifting can be performed without interrupting driving force using the first clutch 12 and the second clutch 16.

Therefore, even when the above gear shifting operation is automatically carried out, the automobile can be driven without causing a sense of discomfort.

Thus, since either of the first clutch 12 and the second clutch 16 constantly transmits power, only one of them is inoperative and idling while the automobile is running.

For this reason, as compared with ordinary automatic transmissions which generate a dragging torque with a plurality of clutches and brakes constantly idling, the twin-clutch transmission generates a smaller dragging torque (resistance) caused by idling of clutch and realizes a high power-transmission efficiency.

Further, in the embodiment shown in FIG. 1, there is the distinctive feature that the axial length of the transmission mechanism is short.

Specifically, as indicated by "L" in FIG. 1, the axial length of the transmission mechanism can be represented as the total length including a pair of transmission gears arranged at both ends.

The dimension L in FIG. 1 is a length including the pair of fifth speed gears 36a and 36b and the pair of second speed gears 40a and 40b on the second output shaft 22 side; between them, there are mainly the pair of third speed gears 34a and 34b, pair of sixth speed gears 30a and 42b, and stroke distances of 3-5 speed sleeve 38, 2-6 speed sleeve 44, 3-5 speed sleeve 38, and 2-6 speed sleeve 44.

The pair of first speed gears 26a and 26b and the first sleeve 28 provided on the first output shaft 20 side are accommodated in a space between the pair of fifth speed gears 36a and 36b and the pair of third speed gears 34a and 34b.

Their actual construction will now be described with reference to a sectional view of FIG. 3.

Figure 3:
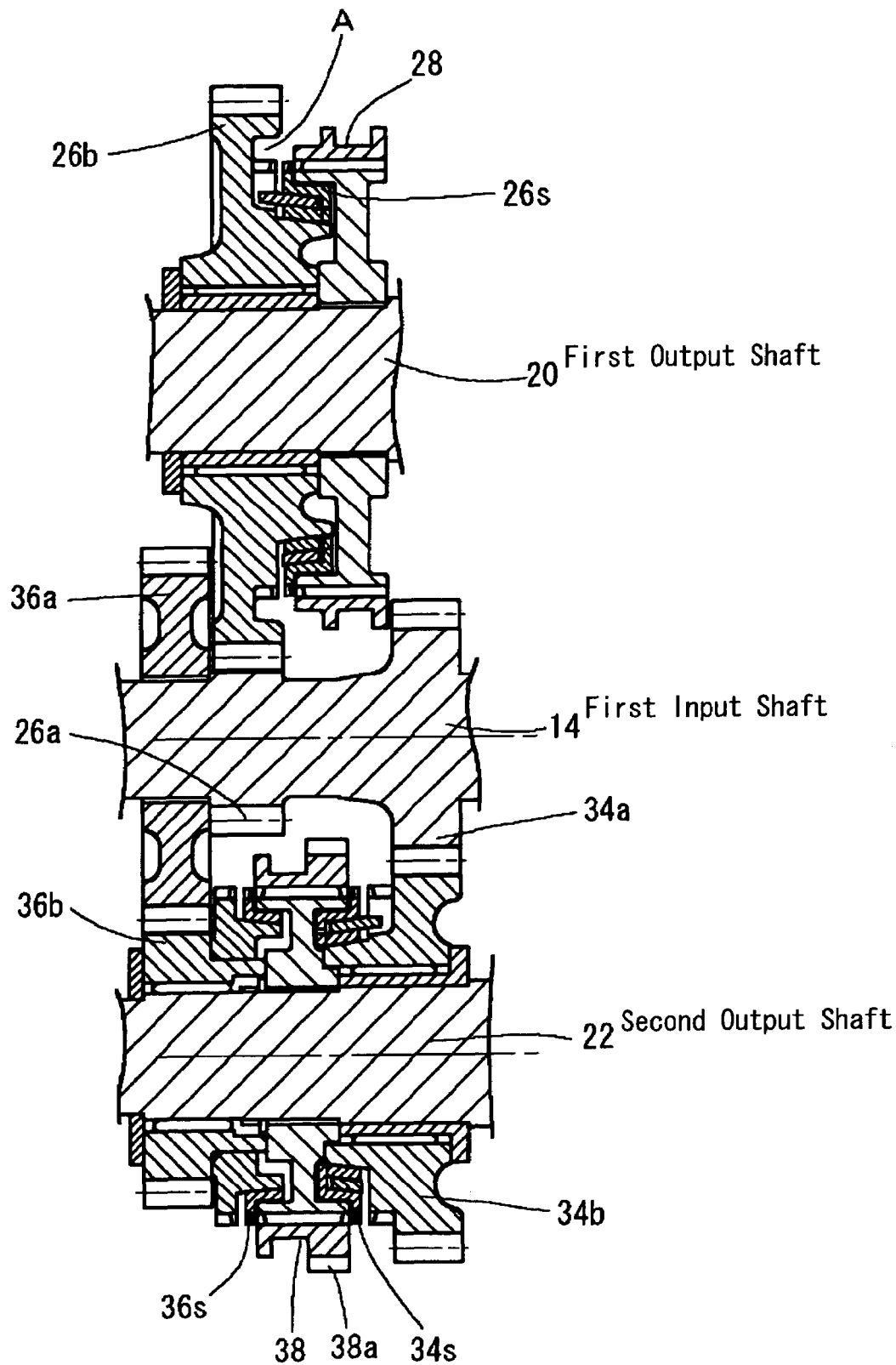
FIG. 3 is a partially sectional view showing an embodied construction of FIG. 1.

Reference numerals used in FIG. 3 are the same as those in FIG. 1. Reference numeral 26s denotes a first speed synchronizer; 34s, a third speed synchronizer; and 36s, a fifth speed synchronizer.

As is clear from FIG. 3, the first speed sleeve 28 is capable of moving only to the left from the illustrated position, and the first sleeve 28 is adapted to go into a recess A which is formed inside the first speed output gear 26b because it has a large diameter. Therefore, the axial space occupied by the pair of first speed gears 26a and 26b and the first speed sleeve 28 is located between the pair of fifth speed gears 36a and 36b and the pair of third speed gears 34a and 34b.

Figure 4:
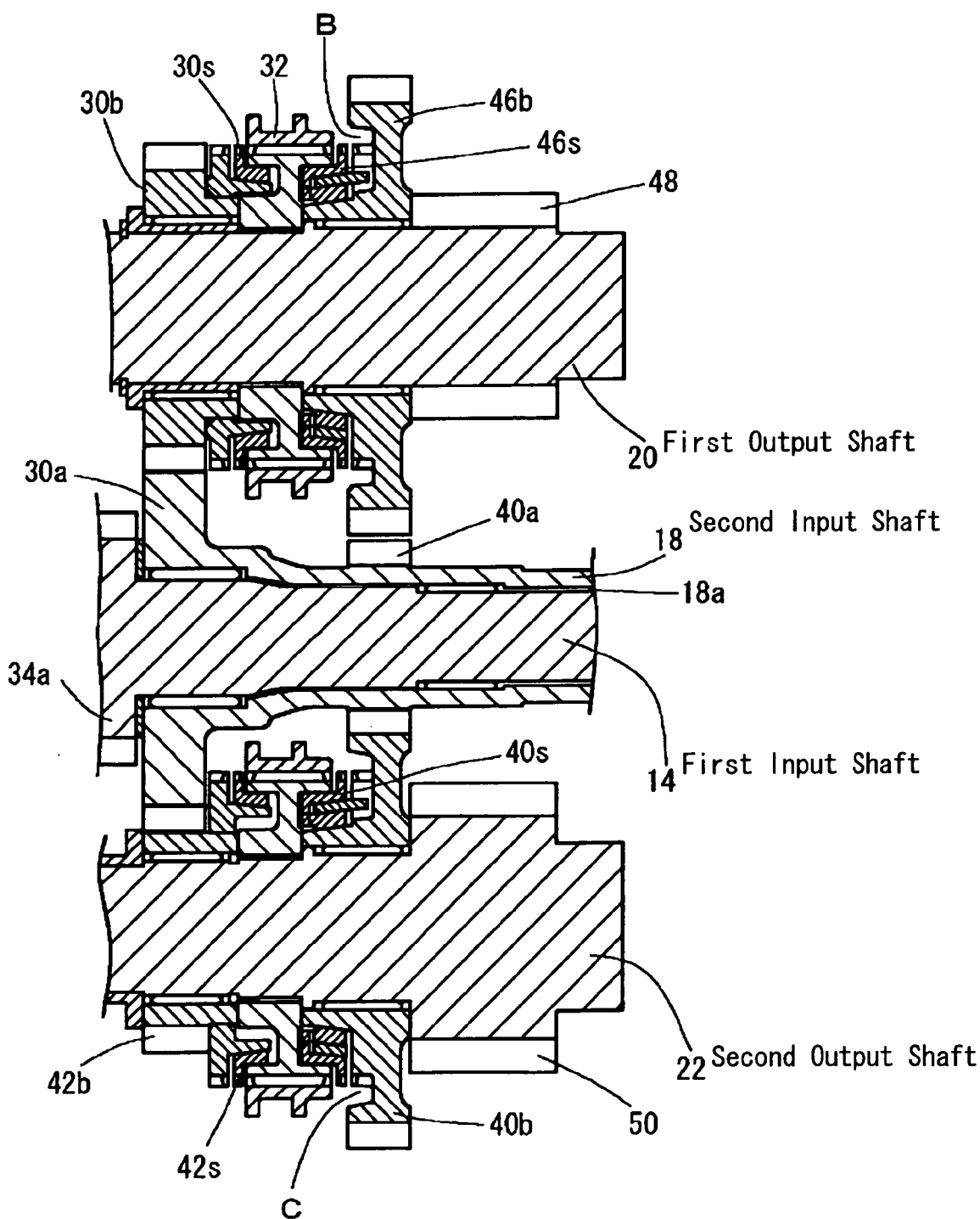
FIG. 4 is a partially sectional view showing another embodied construction of FIG. 1.

FIG. 4 is a sectional view showing the periphery of the pair of fourth speed gears 30a and 30b, pair of sixth speed gears 30a and 42b, pair of second speed gears 40a and 40b, and backward output gear 46b.

It should be noted that reference numeral 30s denotes a fourth speed synchronizer; 40s, a second speed synchronizer; 42s, a sixth speed synchronizer; and 46s, a backward synchronizer.

The idler gears 46c and 46d are omitted from FIG. 4.

Here, it is arranged such that the 4-R speed sleeve 32 and the 6-2 speed sleeve 44 go into recesses B and C formed inside the backward output gear 46b and the second speed output gear 40b.

Therefore, inside the range shown in FIG. 4 as well, the axial length of the transmission mechanism can be reduced.

Such a layout can be realized since the pair of first speed gears 26a and 26b is arranged on the first output shaft 20 side, the pair of third speed gears 34a and 34b and the pair of fifth speed gears 36a and 36b are arranged on the second output shaft 22 side, the backward output gear 46b is disposed on the first output shaft 20 side so as to ensure a space which the idler gear 46c goes into, and the backward output gear 46b and the pair of second speed gears 40a and 40b are located at the right end.

Of course, since the fourth speed input gear 30a doubles as the sixth speed input gear, and the third speed input gear 34a doubles as the backward input gear, there is the advantage that manufacturing costs can be reduced due to a decrease in the number of parts and the space required in the axial direction can be decreased.

Further, as shown in FIG. 3, teeth 38a are formed on the outer periphery of the 3-5 speed sleeve 38, and a parking pole, not shown, is engaged with the teeth 38a so that the 3-5 speed sleeve 38 can be mechanically locked.

Therefore, it is possible to reliably park the automobile even on a sloping road or the like, thus improving the safety.

As is apparent from the above description, according to the embodiment described with reference to FIGS. 1 to 3, the twin-clutch transmission of the six forward speed and one backward speed type can be realized, and while acceleration performance and fuel economy can be improved as compared with conventional four-speed transmissions, the total length of the transmission mechanism can be substantially equivalent to the sum of the lengths of the four pairs of gears and the two sets of sleeves and therefore can be equal to or smaller than the total length of a four forward speed and one backward speed transmission.

Further, the safety in parking on a sloping road or the like can be improved.

Figure 5:
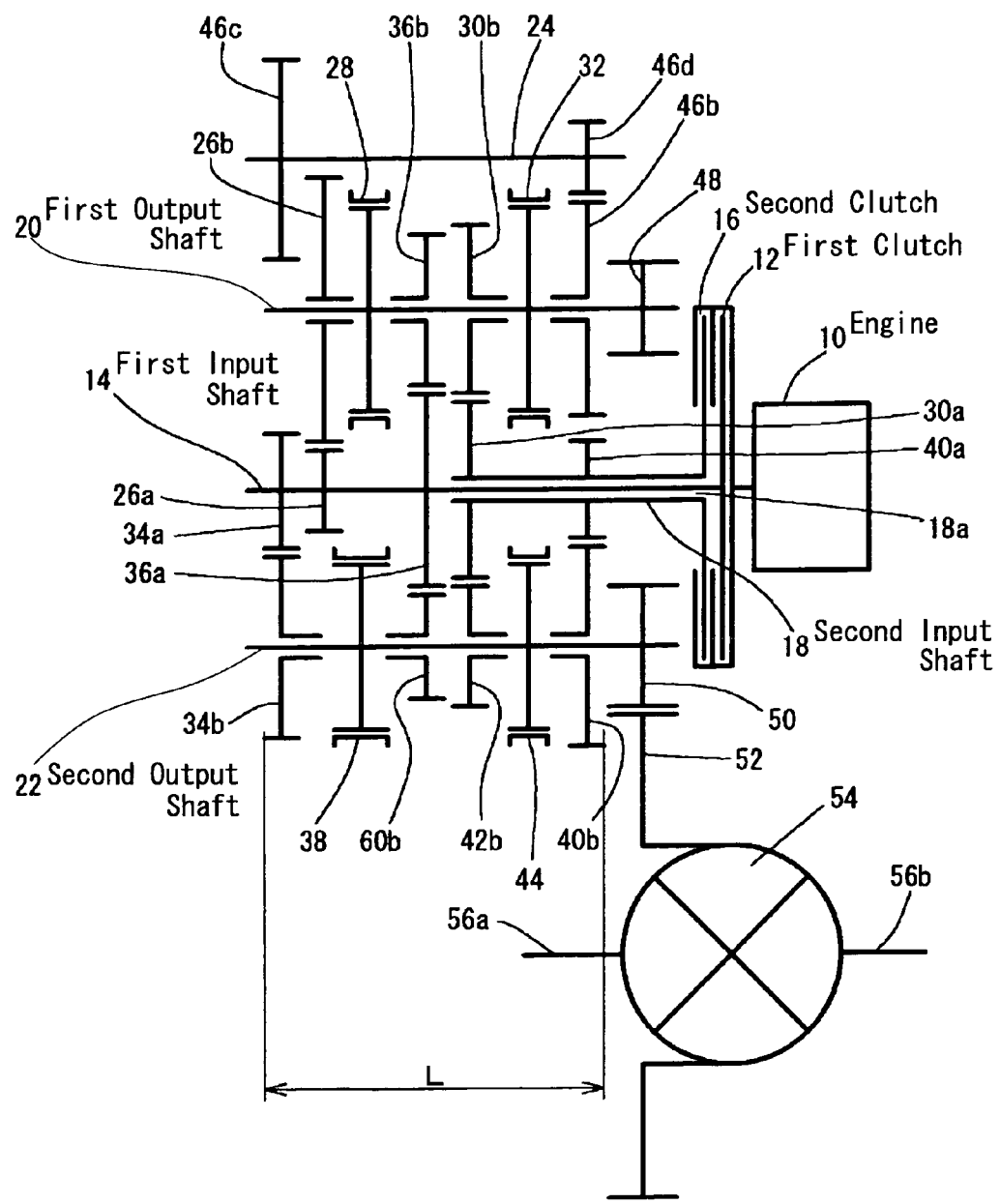
FIG. 5 is a skeleton diagram showing a second embodiment.

Referring next to FIG. 5, a description will be given of a twin-clutch transmission according to a second embodiment of the present invention. FIG. 5 is a skeleton diagram corresponding to FIG. 1.

Here, only parts different from those of the embodiment shown in FIG. 1 to 4 will be described; substantially the same parts are denoted by the same reference numerals, and description thereof is omitted.

The second embodiment differs from the embodiment shown in FIGS. 1 to 4 in that the transmission is a seven forward speed and one backward speed type, and the pairs of gears are arranged in a partially different way due to an increase in the number of gear speeds (gear ratios).

Specifically, the relationship in connection and arrangement of the engine 10, first clutch 12, first input shaft 14, second clutch 16, second input shaft 18, first output shaft 20, second output shaft 22, sub shaft 24, and so forth are the same as those of the embodiment shown in FIGS. 1 to 4, but the pairs of gears are arranged as described below.

The pair of fifth speed gears 36a and 36b as well as the pair of first speed gears 26a and 26b is arranged between the first input shaft 14 and the first output shaft 20, and the 1-5 speed sleeve 28 is provided between the pair of fifth speed gears 36a and 36b and the pair of first speed gears 26a and 26b.

It is arranged such that when the 1-5 speed sleeve 28 is moved to the left as viewed in FIG. 5, the first speed output gear 26b and the first output shaft 20 are connected to each other as in FIG. 1, and in addition, when the 1-5 speed sleeve 28 is moved to the right as viewed in FIG. 5, the fifth speed output gear 36b and the first output shaft 20 are connected to each other.

Further, the fifth peed input gear 36a doubles as a seventh speed input gear as described later.

As in FIG. 1, the pair of fourth speed gears 30a and 30b is disposed between the second input shaft 18 and the first output shaft 20, and the fourth speed input gear 30a doubles as the sixth speed input gear.

Also, as in FIG. 1, the backward output gear 46b is disposed on the first output shaft 20, and the 4-R speed sleeve 32 is located between the pair of fourth speed gears 30a and 30b and the backward output gear 46b.

The pair of third speed gears 34a and 34b which carries out driving at the forward third speed and the pair of seventh speed gears 36a and 60b which carries out driving at the forward seventh speed are disposed between the first input shaft 14 and the second output shaft 22.

As mentioned above, the fifth speed input gear 36a doubles as the seventh speed input gear.

The 3-7 speed sleeve 38 is disposed between the pair of third speed gears 34a and 34b and the pair of seventh speed gears 36a and 60b.

It is arranged such that when the 3-7 speed sleeve 38 is moved to the left as viewed in FIG. 5, the third speed output gear 34b and the second output shaft 22 are connected to each other, and when the 3-7 speed sleeve 38 is moved to the right, the seventh speed output gear 60b and the second output shaft 22 are connected to each other.

As in FIG. 1, the pair of second speed gears 40a and 40b and the pair of sixth speed gears 30a and 42b are disposed between the second input shaft 18 and the second output shaft 22, and as mentioned above, the fourth speed input gear 30a doubles as the sixth speed input gear.

The location and operation of the 2-6 speed sleeve 44 are the same as those in FIG. 1.

The idler gears 46c and 46d are located at slightly different positions from those in FIG. 1, but connect the third speed input gear 34a and the backward output gear 46b to each other as in FIG. 1.

Description of the operation of the embodiment shown in FIG. 5 is omitted because it is basically the same as that of the embodiment shown in FIG. 1 except that a forward seventh speed is added.

As in FIG. 1, since it is arranged such that when the first clutch 12 is engaged, driving is carried out at odd number gear speeds, i.e. the first speed, third speed, fifth speed, and seventh speed, and when the second clutch 16 is engaged, driving is carried out at even number gear speeds, i.e. the second speed, fourth speed, and sixth speed, and therefore gear shifting can be sequentially performed.

The length L of the transmission mechanism according to the embodiment shown in FIG. 5 is slightly greater than the length L in FIG. 1. The total length L in FIG. 5 is greater than the length L in FIG. 1 by a stroke of the 1-5 speed sleeve 28 because it is adapted to move to the right as well.

However, as is the case with the embodiment shown in FIG. 1, there is the distinctive feature that the total length L of the transmission mechanism can be short although it is the seven forward speed and one backward speed type.

Further, as is the case with the first embodiment, teeth for parking may be formed on the 3-7 speed sleeve 38 as described with reference to FIG. 3.

Although detailed description is omitted, the twin-clutch transmission according to the present invention can be practiced in combination with application of the first and second clutches which enable smooth alternate engagement and disengagement, actuators which control the respective sleeves, the way of properly controlling them, and so forth on the basis of common knowledge of a person having an ordinary skill in the art.

INDUSTRIAL APPLICABILITY

According to the present invention, while fuel economy and acceleration performance are improved by increasing the number of gear speeds (gear ratios) as compared with the prior art, the total length can be equal to or smaller than that of a conventional transmission having a smaller number of gear speeds, and therefore, the transmission according to the present invention is particularly useful for vehicles.

The invention claimed is:

1. A twin-clutch transmission comprising:
a first input shaft (14) for transmitting driving force from an engine via a first clutch (12);
a second input shaft (18) for transmitting driving force from the engine via a second clutch (16);
a first output shaft (20), a second output shaft (22), and a sub shaft (24) disposed parallel with the first input shaft and the second input shaft;
a pair of first speed input and output gears (26a, 26b) provided between the first input shaft and the first output shaft;
a pair of fourth speed input and output gears (30a, 30b) provided between the second input shaft and the first output shaft;
a pair of third speed input and output gears (34a, 34b) and a pair of fifth speed input and output gears (36a, 36b) provided between the first input shaft and the second output shaft;
a pair of second speed input and output gears (40a, 40b) and a pair of sixth speed input and output gears (30a, 42b) provided between the second input shaft and the second output shaft;
a backward output gear (46b) provided on the first output shaft; and
idler gears (46c, 46d) provided on the sub shaft,
wherein the third input near is integrated with the first input shaft, and
wherein the idler gears connect the third input gear and the backward output gear to each other.

2. A twin-clutch transmission according to claim 1, wherein the third speed input gear (34a), which is integrated with the first input shaft (14), doubles as a backward input gear.

3. A twin-clutch transmission according to claim 1 or 2, wherein the backward output gear (46b) and the second speed input and output gears (40a, 40b) overlap in an axial direction.

4. A twin-clutch transmission according to claim 1 or 2, further including a sleeve (38) for connecting the third speed output gear (34b) and the fifth speed output gear (36b) to the second output shaft (22), wherein the first speed input and output gears (26a, 26b) partially overlap in an axial direction.

5. A twin-clutch transmission according to claim 1 or 2, wherein the fifth input gear (36a) is integrated with the first input shaft (14) and doubles as an input gear of a pair of seventh speed input and output gears (36a, 60b).

6. A twin-clutch transmission according to claim 3, further including a sleeve (38) for connecting the third speed output gear (34b) and the fifth speed output gear (36b) to the second output shaft (22), wherein the first speed input and output gears (26a, 26b) partially overlap in an axial direction.

7. A twin-clutch transmission according to claim 3, wherein the fifth input gear (36a) is integrated with the first input shaft (14) and doubles as an input gear of a pair of seventh speed input and output gears (36a, 60b).

8. A twin-clutch transmission according to claim 4, wherein the sleeve includes parking gear teeth (38a).

9. A twin-clutch transmission according to claim 6, wherein the sleeve includes parking gear teeth (38a).

* * * * *